INVENTORS
THORNLEY C. JOBE &
EDWARD J. EVANS
BY Eugene M. Whitacre
ATTORNEY

REMOTE CONTROL SYSTEM

Filed Jan. 17, 1962 2 Sheets-Sheet 2

INVENTORS
THORNLEY C. JOBE &
EDWARD J. EVANS
BY Eugene M. Whitacre
ATTORNEY

United States Patent Office 3,218,388

Patented Nov. 16, 1965

3,218,388

REMOTE CONTROL SYSTEM

Thornley C. Jobe, Indianapolis, and Edward J. Evans, Bloomington, Ind., assignors to Radio Corporation of America, a corporation of Delaware Filed Jan. 17, 1962, Ser. No. 166,869
5 Claims. (Cl. 178—5.8)

Figure 1A:
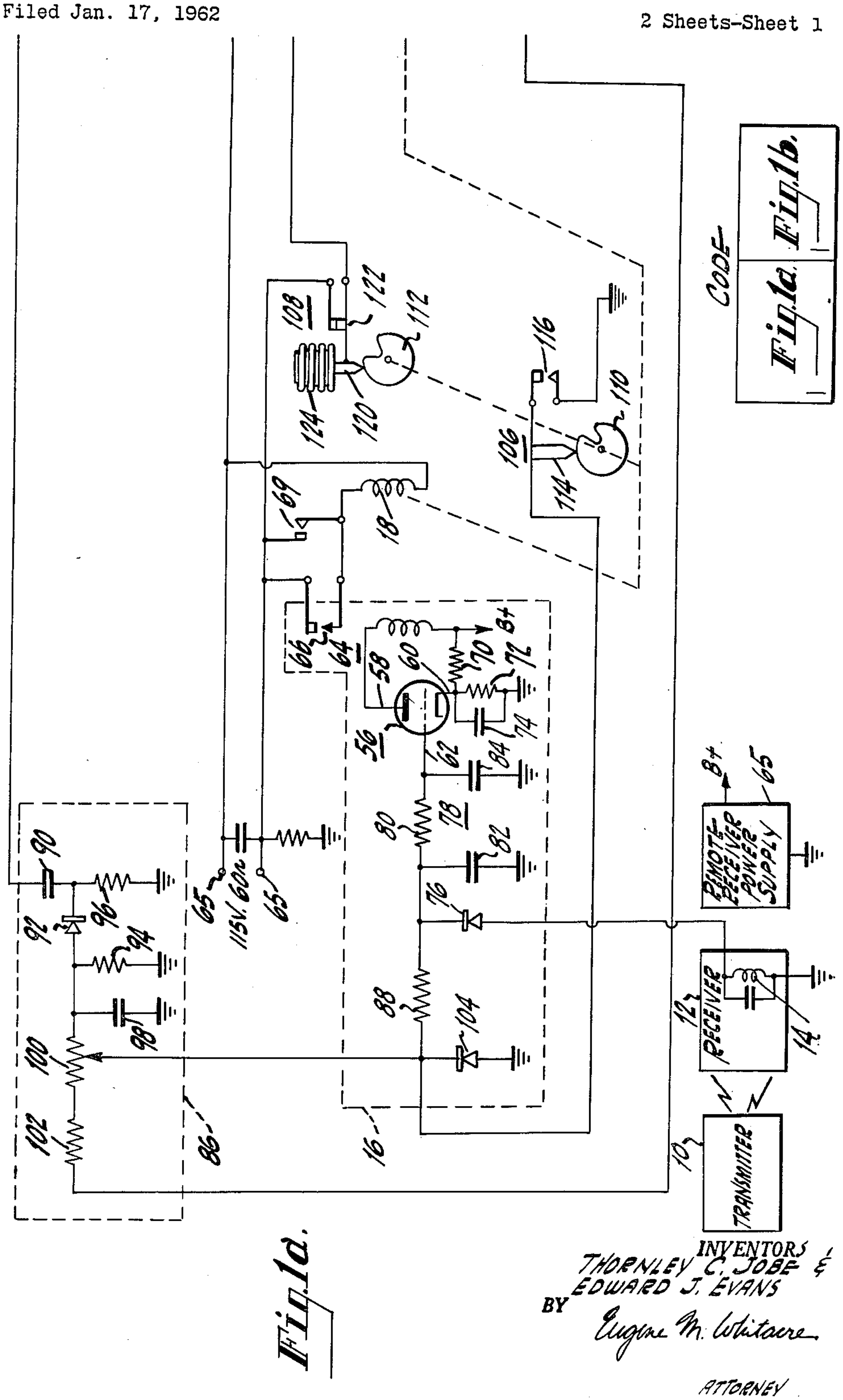
Figure 1B:
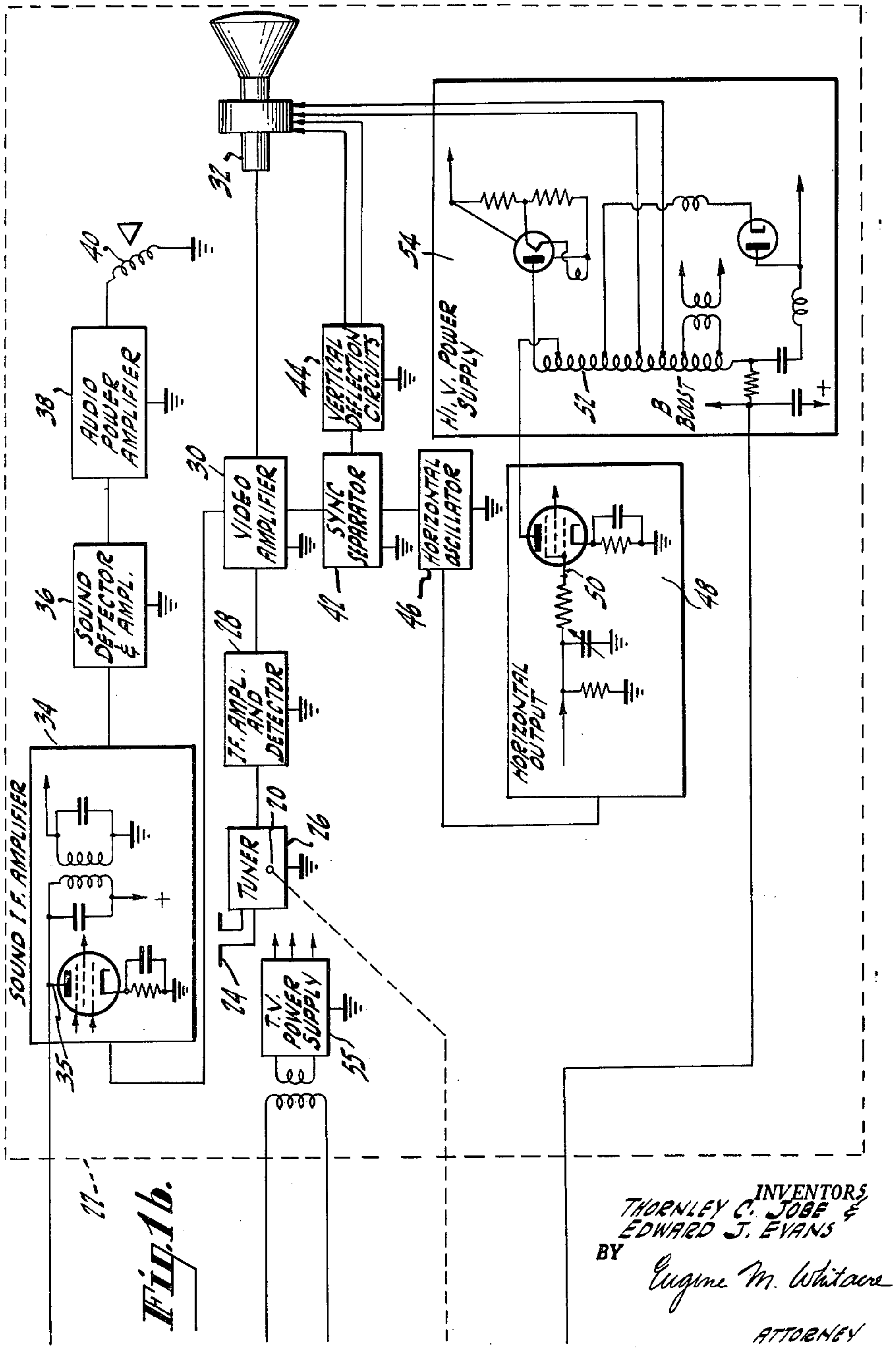

This invention relates to remote control systems and more particularly to remote control tuning systems of the signal-seeking type.

Remote control systems for signal wave receivers, such as television receivers, frequently utilize a driving device, such as a motor, to operate the tuning elements or channel selector in the receiver. The motor may be initially energized by a control signal which is caused to be transmitted by a viewer wishing to change channels, and then kept energized by a switch which connects the motor across a power source.

In order to stop the motor at a desired channel, a programming means is included to open the energizing switch at this channel. In most step-by-step remote control systems, the programming means comprises a switching system operated by the tuner motor to open the motor energizing circuit at particular channels. Thus, the switching system has to be preset to tune in particular channels and because different channels are received in different geographical areas, each receiver must be individually programmed for the area in which it will be operated. Additionally, once the system is programmed to tune in particular channels, the motor will always stop on these channels. In many areas, the local channels do not transmit during the entire day so that even though no signals can be received on some channels, the television receiver will still be programmed to stop on these channels.

To obviate the above disadvantages, remote control tuning systems of the signal-seeking or stop-on-signal type may be utilized. Such systems only tune in a channel when a signal is actually being received. However, a difficulty that may be encountered in such systems is that if no signals are being received on any channel, the motor may be continuously energized to keep searching for a signal.

Accordingly, it is an object of this invention to provide an improved remote control tuning system.

It is another object of this invention to provide an improved remote control tuning system which tunes in a channel only when a signal is being received.

It is a further object of this invention to provide an improved remote control system of the signal-seeking type which automatically turns off the television receiver when no signals are being received on any channel.

In an embodiment of the invention, the channel selector of a television receiver is tuned by a motor, which is energized by a relay coupling the motor across a power source. The relay is incorporated in a control circuit which includes a relay control tube. The control grid of the relay tube is coupled to both a remote control receiver as well as to a signal sensing circuit in the television receiver.

The signal sensing circuit includes means for deriving a signal indicating the presence or absence of a television signal. For example, the output signal from the sound intermediate frequency amplifier may be rectified to produce such an indicating signal. In accordance with an embodiment of the invention, the indicating signal is of negative polarity when a signal is being received and is superimposed on a positive D.-C. biasing voltage. The resultant composite voltage is applied to the control grid of the relay tube. The two voltages are proportioned so that the control tube is conducting except during the time a television signal is being received.

The remote control receiver processes received control signals to produce a voltage of a positive polarity which is applied to the control grid of the relay tube to cause the conduction thereof. The conduction of the relay tube closes the relay contacts which energizes the motor and starts the channel selector scanning the frequency spectrum. The signal sensing circuit maintains the scanning operation while no television signals are being received by applying a voltage of a positive polarity to the control grid of the relay tube to keep the relay tube conducting and the motor rotating. When a television signal is received at a particular channel frequency, the rectifier portion of the signal sensing circuit rectifies the signal waves to produce a voltage of a negative polarity. The control grid of the relay tube is then driven in the negative direction and the tube cuts off. Thus, the motor is de-energized and the channel selector stops at this channel.

If the signal is subsequently lost, the negative voltage developed in the signal sensing circuit is removed and the scanning operation commences again. When no signals are available on any channel, continuous operation of the motor is prevented by causing the control grid of the relay tube to be biased to cut off at one position during each complete cycle of rotation of the channel selector so as to de-energize the relay and stop the motor. The one position may be selected to be an unused channel and may constitute an automatic "off" position for the television receiver by coupling a time delay switch to also be operated at this position. The time delay switch operates after a predetermined time delay to de-energize the television receiver power supply if no remote control signal is transmitted to move the channel selector before the end of the time delay period.

In accordance with a feature of the invention, the control grid of the relay tube is clamped to ground by a clamping diode to keep the grid from going more negative than ground potential. The relay tube is also biased to cut-off with ground potential at the grid by applying a positive voltage to its cathode. This prevents the signal sensing circuit from developing high negative voltages on the control grid of the relay tube when television signals of various but high signal strength are being received. If the control grid were allowed to go negative with respect to ground, the amplitude of the positive polarity voltage developed by a remote control signal would have to be large enough to overcome the negative voltage in order to energize the motor. Since the remote control transmitter in many remote control systems transmits an ultrasonic acoustical signal, the sensitivity of the system is already an inverse function of the distance between the remote control transmitter and receiver. The distance sensitivity would therefore also become an inverse function of received television signal strength in such systems unless the control grid of the relay tube is clamped to ground.

Thus, it is a further object of this invention to render the distance sensitivity of a remote control automatic tuning system of the acoustical type independent of the signal strength of received television signals.

The novel features that are considered to be characteristic of this invention are set forth with particularity in the appended claims. The invention itself however, both as to its organization and method of operation, as well as additional objects and advantages thereof, will best be understood from the following description when read in conjunction with the accompanying drawing in which the sole figure is a schematic circuit diagram, partly in block form, of a remote control system in accordance with the invention.

Referring now to the drawing, the remote control system includes a remote control transmitter 10 for transmitting control signals which are received by a remote control receiver 12. The transmitter 10 may for example include mechanical resonator for generating an ultrasonic acoustical signal of a particular frequency. With such a transmitter, the remote control receiver 12 may include an acoustic-electric transducer and an amplifying channel (not shown) as well as a resonant circuit 14 tuned to the frequency of the control signal. However, it is to be understood that other types of transmitters, such as those including electrical oscillators, may be utilized in practicing the invention. The control signals from the remote receiver 12 are applied to a control circuit 16 which controls the operation of a driving device such as a single phase motor 18. The drive shaft of the motor 18 is mechanically coupled to a channel selector 20 of a television receiver 22 to control the tuning thereof.

The television receiver 22 will be described first in order to disclose the origin of the voltages necessary for the proper operation of the remote control tuning system. The television receiver 22 is of any known type but the particular receiver which is illustrated in the drawing, to set forth one environment in which the invention may be practiced, includes a Radio Corporation of America KCS–134 series chassis which is shown in the publication "Television Service Data"—1960, No. T7—prepared by the RCA Service Co., Camden 8, New Jersey.

The television receiver 22 is coupled to an antenna 24 for intercepting signals in the television frequency bands which signals are applied to a tuner 26 which includes the variable channel selector 20 for selecting any one of a plurality of television signals. A selected television signal is heterodyned with a local oscillatory wave generated in the tuner 26 to provide a correspondingly modulated signal of an intermediate frequency. The tuner 26 is a continuously rotatable step-by-step tuner which includes a mechanical detent means for accurately positioning the tuning means for each of the twelve VHF television channel positions.

The intermediate frequency signal is amplified and detected in an intermediate frequency amplifier and video detector stage 28. The signal output from the stage 28 includes a composite video signal which is amplified by a video amplifier 30 and applied to a picture tube 32.

An intercarrier audio component, produced by the interaction of the video and audio intermediate frequency carrier waves in the video detector of the stage 30, is applied to a sound intermediate frequency amplifier 34. The sound I-F amplifier 34 includes a vacuum tube, the plate circuit 35 of which includes a resonant circuit tuned to the 4.5 megacycle intercarrier audio component which is standard in present day television receivers. As will be described more fully below, the plate circuit 35 is the point selected to sense whether or not a television signal is being received in the receiver 22. This point is selected because there exists a consistent and significant difference in the amount of voltage produced when receiving a useable television signal as contrasted to a no-signal condition. The amplified I-F output from the amplifier 34 is applied to a sound detector and first audio amplifier stage 36 and then to an audio power output amplifier 38 before application to a loudspeaker 40.

The synchronizing signal components in the composite video signal are applied from the video amplifier 30 to a synchronizing signal separator 42. The sync separator 42 separates the synchronizing signals and applies them to vertical deflection control circuits 44 to control the vertical deflection of the cathode ray beam in the picture tube 32. The sync separator 42 also applies the horizontal synchronizing signals to a horizontal oscillator stage 46 which includes the usual automatic frequency control circuits. The horizontal oscillator 46 is coupled to a horizontal output tube 48 which includes a control grid 50. A relatively large negative voltage is developed at the control grid 50 which may be utilized, if desired, as a source of negative voltage for stopping the rotation of the motor 18 once on every complete cycle of rotation of the channel selector 20.

The horizontal output tube 48 drives a horizontal output transformer 52 in the high voltage power supply circuit 54. The horizontal output transformer 52 is of the auto-transformer type and the horizontal deflection coils are connected across a small portion of the transformer 52 to control the horizontal deflection of the cathode ray beam in the picture tube 32. A B boost voltage is developed in a known manner in this circuit and is utilized as the source of the positive voltage to maintain the motor 18 rotating in the absence of a received television signal. The various stages of the television receiver 22 are suitably connected to a television receiver power supply 55 by connections not shown.

Referring now to the remote control circuit components which control the tuning of the television receiver 22, the control circuit 16, for controlling the motor 18, includes a relay control tube 56 having plate 58, cathode 60, and control grid 62 electrodes. Although the circuits described herein refer to a control tube as controlling the relay 64, it will be understood that a transistor or other device may be also used by proper selection of the magnitudes and polarities of the voltages applied thereto in accordance with known techniques.

The plate 58 of the relay tube 56 is connected to the B+ terminal of the remote control receiver power supply 65 through the winding of a relay 64. In this regard, it should be noted that the remote control receiver 12 could, if desired, receive its operating B+ potential from the television receiver chassis. The relay 64 includes a pair of normally open contacts 66 which, when closed, connect the field winding of the motor 18 directly across a pair of A.C. supply line terminals 68. The contacts of a front panel controlled touch bar switch 69 are shunted across the relay contacts 66 for manual starting of the motor 18. The switch 69 is conveniently mounted on the television receiver cabinet to be readily accessible to an operator. The relay tube 56 is quiescently biased by means of a voltage divider which includes a resistor 70, connected between the B+ terminal of the remote control receiver 12 power supply and the cathode 60, and a resistor 72, connected between the cathode 60 and ground. A capacitor 74 is shunted across the resistor 72 to bypass remote control signal alternations. The values of the resistors 70 and 72 are selected to bias the tube 56 to cut off when the grid 62 is at ground potential or alternatively so that a plate current, which is less than the drop-out current of the relay 64, flows when the control grid 62 is at ground potential. Control signals from the remote control receiver 12 are applied to the control grid 62 of the relay tube 56 through a diode 76 and a filter 78 which includes a series resistor 80 and a pair of shunt capacitors 82 and 84.

A signal sensing circuit 86 is also connected to the control grid 62 of the relay tube 56 through an isolating resistor 88 and the filter 78. The signal sensing circuit 86 includes a blocking capacitor 90 coupled between the plate circuit 35 of the sound intermediate frequency amplifier 34 and the cathode of a rectifying diode 92. The anode of the rectifier 92 is connected to ground through a resistor 94 while the cathode thereof is connected to ground through a resistor 96. A filtering capacitor 98 is also connected between the anode of the rectifier and ground. A potentiometer 100 and a dropping resistor 102 are coupled between the anode of the rectifier 92 and the source of B boost voltage in the high voltage power supply circuit 54 in the television receiver 22. The adjustable arm of the potentiometer 100 is connected through the resistor 88 and filter 78 to the control grid 62 of the relay tube 56, to provide the connection of the signal sensing circuit 86 described above. The anode of a clamping diode 104 is grounded while the cathode thereof is connected to the junction of the adjustable arm of the potentiometer 100 and the resistor 88, to prevent the control grid 62 from going more negative than ground potential.

The motor 18 is also coupled to operate a pair of switches 106 and 108. The switches 106 and 108 include cams 110 and 112, respectively, which are driven by the drive shaft of the motor 18. Each cam includes a detent position on the periphery thereof which is aligned to operate the switches simultaneously. In view of this, the cam 110 may be merely an extension of the cam 112 but for the purpose of clarity they are shown separately.

The switch 106 includes an immediate action cam follower 114 which closes a pair of contacts 116 when in the detent position of the cam 110. The contacts 116, when closed, ground the control grid 62 and cuts-off the relay tube 56. Alternatively the contacts 116, instead of being grounded when closed, may connect the control grid 62 to the negative voltage developed at the control grid 50 of the horizontal output tube 48 in the television receiver 22, and thereby cut-off the relay tube 56.

The switch 108 constitutes a time delay "on-off" switch for the television receiver power supply circuit 55 and includes a cam follower 120 which operates a pair of electrical contacts 122. When the contacts 122 are closed, the primary winding of the television receiver power supply transformer is connected directly across the A.C. supply line contacts 68. The cam follower 120 is mounted on any suitable time delay mechanism, such as a pneumatic holding device or bellows 124, to prolong the time it takes for the cam follower 120 to drop into the detent position of the cam 112 to operate the contacts 122.

In describing the operation of the remote control system, it will be assumed that channel 13 is an unused channel in the area of operation of the television receiver 22 and will therefore be selected as a television receiver "off" position. Assuming the television receiver to be off, the channel selector 20 is on channel 13, the detent positions on the cams 110 and 112 will be aligned so that the contacts 116 in the stopping switch 106 are closed and the contacts 122 in the "on-off" switch 108 are open. With the contacts 122 open, the television receiver 22 is de-energized and a viewer wishing to turn on the television receiver 22 may, for example, do so by depressing the touch bar switch 69. The motor 18 is thereby energized from the A.C. supply line terminals 68 and, in rotating, forces the cam followers 114 and 120 out of the detent positions on the cams 110 and 112, respectively. The "on-off" contacts 112 close, connecting the primary winding of the television receiver power supply transformer across the A.C. supply line terminals 68 and the receiver 22 commences to warm up. Simultaneously, the contacts 116 in the stopping switch 106 open. The viewer will release the touch bar switch 69. After this release and during the warm up period, the motor 18 is not energized because the voltage at the control grid 62 of the control tube 56 is close to ground. When the set has warmed up, the B boost voltage will be developed in the high voltage power supply circuit 54 and cause a positive polarity voltage to be applied to the control grid 62 of the relay tube 56, as long as the channel selector 20 has not stopped on a channel receiving a television signal. The positive polarity voltage is developed in the voltage divider portion of the signal sensing circuit 86 which comprises the resistors 94 and 102 and the potentiometer 100, connected between the B boost voltage source and ground. The positive voltage applied to the grid 62 causes the relay tube 58 to conduct sufficiently to close the relay contacts 66 and energize the motor 18. The rotation of the motor 18 causes the channel selector 20 to switch to successive channels. The frequency scanning of the television frequency band continues until a television signal is received on a particular channel. A received television signal causes a significant increase in voltage at the plate electrode of the sound I-F amplifier 34, which is applied through the capacitor 90 to the rectifying diode 92 in the signal sensing circuit 86. The diode 92 rectifies the sound I-F voltage, in a D.-C. conduction path including the resistors 94 and 96, and develops a negative going voltage at the anode of the diode 92. The negative going voltage reduces the voltage at the control grid 62 of the relay tube 56 so that the plate current decreases and the relay contacts 66 open. The motor 18 is de-energized and the channel selector 20 is thereby tuned to a particular channel receiving a television signal. The channel selector 20 will remain tuned to this channel, if not moved off by the viewer, as long as the video and audio carriers are both being transmitted.

The clamping diode 104 prevents the control grid from going more negative than ground potential regardless of the strength of the television signal being received. With properly chosen biasing resistors 70 and 72 for the relay control tube 56, the potentiometer 100 can be set to apply a voltage which is substantially at ground potential to the control grid 62 for a channel having the weakest signal strength that still produces a useable television signal. When the channel selector 20 is at a channel having a much higher signal strength, which would tend to drive the control grid 62 highly negative, the low resistance of the forward conducting diode 104 clamps the grid 62 at substantially ground potential. This feature of the invention is important in remote control systems. In such systems, the amplitude of the control signal received at the remote control receiver 12 is an inverse function of the distance between these devices. If the control signal must overcome a negative voltage on the grid 62 of the control tube 56 due to the television signal, the transmitter 10 would have to be brought close to the remote receiver 12 to effect a change in channels. The clamping diode 104 therefore makes the sensitivity of the remote tuning system to control signals substantially independent of the signal strength of the television signal being received.

If a viewer wishes to change channels, a remote control signal is transmitted from the transmitter 10. The signal is received in the receiver 12, and rectified in the diode 76 to produce a positive going voltage at the grid 62 of the relay tube 56. As a result of the positive going voltage, the control tube 56 conducts more heavily and the motor 18 is energized to start the scanning process. Once the channel selector is rotated off the channel being previously viewed, the negative going voltage which was developed by the intercarrier sound component of the composite television signal is removed from the signal sensing circuit 86. Therefore, the scanning operation is continued automatically by the signal sensing circuit 86 until another channel having a television signal is received.

When the channel selector 20 is rotated to the channel 13 "off" position, the cam follower 114 in the scanning stop switch 116 immediately drops into the detent position on the cam 110 thereof and closes the contacts 116. This operation couples the control grid 62 of the relay tube 56 to ground potential. The relay tube 56 is thereby cut off and the relay contacts 66 open. The motor 10 is de-energized and stops the channel selector 20 at channel 13.

The power "on-off" switch 108 is also aligned to operate on channel 13 but the pneumatic holding device 124 prevents the cam follower 120 from dropping into the cam 112 detent position for any predetermined time such as 10 to 30 seconds. This time delay period gives a viewer the option of transmitting another control signal to move the channel selector 20 off channel 13. If no control signal is transmitted during this period, the cam follower 120 will open the "on-off" contacts 122 when dropping into the detent position. Thus, the television receiver power supply 55 will be disconnected from the A.C. supply line terminals 68 and the receiver 22 will be turned off. Continuous operation of the motor 18 is thereby prevented, even if all television channels go off the air, since the channel selector 20 has to go through the channel 13 "off" position once upon every complete cycle or rotation thereof.

It is apparent that other portions of the television receiver 22 could be selected to provide the necessary voltages for the proper operation of a remote tuning system in accordance with the invention. The particular embodiment which has been described has been built and tested. Inasmuch as the circuit specifications may vary according to individual designs, the following circuit specifications are included by way of example only:

Resistors 70, 72, 94 and 96 are 180,000; 12,000; 100,000; and 100,000 ohms respectively.
Resistors 80, 88, 102 and potentiometer 100 are 1; 2.2; 10; and 1 megohms respectively.
Capacitors 74, 82, 84 and 98 are 100; .01; .01; and .01 microfarads respectively.
Capacitor 90 is 1.5 micromicrofarads and Diode 92 is type 1N64.

Thus, in accordance with the invention, a remote control tuning system is provided which automatically tunes in only those channels which are transmitting television signals. The remote tuning system includes an automatic stop position on every complete cycle of rotation of the tuner to prevent continuous operation of the motor when no signals are being televised. Furthermore, for acoustical remote control transmitter systems, the amplitude of the control signals for proper operation of the tuning function is made independent of the signal strength of received television signals.

What is claimed is:

1. A signal-seeking automatic tuning system for a television receiver for receiving television signals which include video and audio carrier signals separated by a fixed frequency, said receiver having a power supply energized from a pair of A.C. supply line terminals and including a tuner with a multi-position movable tuning element for selecting any one of a plurality of television signals and converting said signals to intermediate frequency signals and a detector for heterodyning said intermediate frequency signals to derive an intercarrier signal of a frequency corresponding to said fixed frequency; comprising in combination, a motor coupled to drive the tuning element in said tuner;
a motor control tube having
an output circuit for coupling said motor to said supply line terminals to energize said motor when said tube is conducting,
and an input circuit;
means for coupling said input circuit to a point of positive potential in said receiver to cause said tube to conduct to energize said motor;
means for detecting the presence of said intercarrier signal when a television signal is received for deriving a voltage of a negative polarity and of a magnitude related to the amplitude of said intercarrier signal;
means for applying said negative voltage to said input circuit to cut-off said tube and stop said tuning element when a television signal is received;
a time delay mechanism;
a cam driven by said motor for actuating said time delay mechanism on one of the positions of said tuning element;
an on-off switch connected in series between said television receiver power supply and said supply line terminals and positioned for opening by said time delay mechanism after a predetermined time delay to deenergize said television receiver power supply; and
a stopping switch connected in series between said input circuit of said motor control tube and a point of reference potential and adapted to be closed by said cam at said one position of said tuning element to cut off said motor control tube whereby said motor is stopped once upon every complete cycle of operation of said tuning element and after a predetermined time delay the television receiver is deenergized by said on-off switch.

2. A signal-seeking remote control tuning system for a television receiver for receiving television signals which include video and audio carrier signals separated by a fixed frequency, said receiver having a power supply which is energized from a pair of alternating current supply line terminals, said receiver including a tuner with a multi-position movable tuning element for selecting any one of a plurality of television signals and converting said signals to corresponding signals of intermediate frequency, a detector for heterodyning said intermediate frequency signals to derive an intercarrier signal of a frequency corresponding to said fixed frequency, an amplifier for amplifying said intercarrier signal, and horizontal deflection control circuits for deriving a B boost voltage; comprising in combination, a motor coupled to drive the movable tuning element of said tuner,
a motor control tube having an input grid circuit and an output plate circuit and adapted to be cut off when said input grid circuit is at ground potential,
a relay having a pair of contacts coupled in series between said supply line terminals and said motor to energize said motor when actuated,
said relay adapted to actuate said contacts when conduction occurs in the output plate circuit of said tube,
a signal sensing circuit comprising a voltage divider portion and a rectifier portion,
means for coupling said voltage divider portion between said B boost voltage and the input grid circuit of said motor control tube to apply a positive voltage thereto to cause said motor to drive said tuning element through the various positions thereof,
means for coupling said rectifier portion between said intercarrier signal amplifier and said input grid circuit of said motor control tube for deriving a negative control voltage which is related to said intercarrier signal and which cuts off said motor control tube to stop said tuning element when a television signal is received,
a clamping diode having a cathode coupled to said input grid circuit of said motor control tube and an anode connected to ground to prevent said input grid circuit from going negative with respect to ground when television signals are received,
a time delay mechanism,
a cam driven by said motor for actuating said time delay mechanism at one of the positions of said tuning element,
an on-off switch connected in series between said television receiver power supply and said supply line terminals and positioned for opening by said time delay mechanism after a predtermined time delay to deenergize said television receiver power supply,
a stopping switch connected in series between a point of ground potential and said input grid circuit of said motor control tube and adapted to be closed by said cam at said one position of said tuning element to cut off said motor control tube and stop said motor at said one position, whereby said motor is stopped and said television receiver is de-energized when no television signals are being received.

3. In a system for automatically tuning a signal wave receiver to radio frequency signals, the combination comprising, a motor coupled to drive said tuning element, a motor control circuit responsive to first and second control voltage to control the energization of said motor, means in said signal wave receiver for developing a first control voltage when a radio frequency signal is present, said first control voltage being of an amplitude related to the amplitude of said radio frequency signal, means for applying said first control voltage to said motor control circuit to de-energize said motor when a radio frequency is present, said means for applying said first control voltage including a clamp circuit for clamping said first control voltage to a predetermined maximum value in the polarity direction which tends to cause said motor control circuit to de-energize said motor regardless of the amplitude of said radio frequency signals, and means for applying a second control voltage to said motor circuit to energize said motor.

4. A system for automatically tuning a signal wave receiver as defined in claim 3 wherein said means for applying said second control voltage comprises a remote control receiver responsive to command signals from a remote location.

5. A signal-seeking automatic tuning system for a television receiver for receiving television signals which include video and audio carrier signals separated by a fixed frequency, said receiver having a power supply energized from a pair of voltage supply line terminals and including a tuner with a multi-position tuning element for selecting any one of a plurality of television signals; comprising in combination, a motor coupled to drive the tuning element in said tuner;

a motor control stage having an output circuit for coupling said motor to said supply line terminals to energize said motor when said stage is conducting, and an input circuit;

means for coupling said input circuit to a point in said receiver which is at a potential to cause said stage to energize said motor;

means responsive to received television signals for deriving a control voltage of a polarity which causes said stage to de-energize said motor, means for applying said control voltage to said input circuit to cause said stage to de-energize said motor and stop said tuning element when a television signal is received, a time delay mechanism, a cam driven by said motor for actuating said time delay mechanism on one of the positions of said tuning element, an on-off switch connected in series between said television receiver power supply and said voltage supply line terminals and positioned for opening by said time delay mechanism after a predetermined time delay to de-energize said television receiver power supply; and a stopping switch connected in series between said input circuit of said motor control stage and a point of potential which causes said stage to de-energize said motor, and adapted to be closed by said cam at said one position of said tuning element, whereby said stopping switch applies a voltage to stop said motor once during each complete cycle of operation of said tuning element, and, after a predetermined time delay, the television receiver is de-energized by said on-off switch.

References Cited by the Examiner

UNITED STATES PATENTS

| | | | |
|---|---|---|---|
| 2,890,274 | 6/1959 | Guyton ____________ | 178—5.8 |
| 3,029,305 | 4/1962 | Marks ______________ | 178—5.8 |
| 3,049,586 | 8/1962 | Hooper ____________ | 178—5.8 |

DAVID G. REDINBAUGH, *Primary Examiner.*